United States Patent [19]
Hofmann

[11] Patent Number: 5,826,806
[45] Date of Patent: Oct. 27, 1998

[54] METHOD AND ARRANGEMENT FOR BREAKING UP MATERIALS IN METALLIC CASINGS

[75] Inventor: Juergen Hofmann, Salzwedel, Germany

[73] Assignee: TZN Forschungs-und Entwicklungszentrum Unterluess GmbH, Unterluess, Germany

[21] Appl. No.: 761,554

[22] Filed: Dec. 6, 1996

[30] Foreign Application Priority Data

Dec. 7, 1995 [DE] Germany ............... 195 45 579.7

[51] Int. Cl.⁶ .................................................. B02C 19/18
[52] U.S. Cl. .................................................. 241/1; 241/301
[58] Field of Search ............................ 241/1, 301

[56] References Cited

U.S. PATENT DOCUMENTS

| | | | |
|---|---|---|---|
| 3,715,082 | 2/1973 | Carley-Macauly et al. | 241/1 |
| 3,770,212 | 11/1973 | Kassir et al | 241/1 |
| 4,540,127 | 9/1985 | Andres | 241/1 |
| 4,821,729 | 4/1989 | Makofski et al. . | |
| 5,220,913 | 6/1993 | Horbal et al. . | |

FOREIGN PATENT DOCUMENTS

| | | | |
|---|---|---|---|
| 4105224C1 | 2/1992 | Germany . | |
| 421473A1 | 11/1992 | Germany . | |
| 156118 | 12/1963 | U.S.S.R. | 241/1 |
| 0594998 | 2/1978 | U.S.S.R. | 241/1 |
| 0816546 | 4/1981 | U.S.S.R. | 241/301 |
| 85 06 34 | 8/1981 | U.S.S.R. . | |
| 0876162 | 11/1981 | U.S.S.R. | 241/1 |
| 1392717 | 11/1989 | U.S.S.R. | 241/1 |

*Primary Examiner*—Mark Rosenbaum
*Attorney, Agent, or Firm*—Spencer & Frank

[57] ABSTRACT

A method and apparatus for separating a material disposed inside a metal casing from the metal casing. A composite is provided including the metal casing and the material disposed inside the metal casing. An electrode system distinct from the metal casing is arranged inside a liquid. A high energy pulse is generated on the electrode system through spark discharge in the liquid thereby generating a pressure pulse. The material disposed in the metal casing is separated from the metal casing by effecting an absorption of the pressure pulse by the composite thereby breaking up the material.

7 Claims, 2 Drawing Sheets

METHOD AND ARRANGEMENT FOR BREAKING UP MATERIALS IN METALLIC CASINGS

CROSS-REFERENCE TO RELATED APPLICATIONS

The right of priority is claimed herein with respect to German application No. 195 45 579.7 filed in Germany on Dec. 7, 1995, the disclosure of which is incorporated herein by reference.

BACKGROUND OF THE INVENTION

The invention relates to a method for separating materials in metallic casings from the metal casings, in particular from catalytic converters for motor vehicles, by breaking up the materials, and to and an arrangement for carrying out the method.

It is known to break up brittle materials inside metallic casings in composites including the metal casings and the materials disposed therein, in particular catalytic converters for motor vehicles, by cutting the metal casing mechanically, removing the ceramic components and subsequently breaking up the ceramic components mechanically.

German Patent Document DE-PS 41 05 224 specifies a method for recovering the catalytic noble metals on metal carriers for catalytic converters on motor vehicles. The metal carriers in this case are broken up mechanically into such fine particles that the ceramic oxide layer, together with the applied noble metals, are almost completely separated as dust from the metal carrier particles. Following that, the dust is separated and thereafter, the noble metal is separated out with a pyro-metallurgical or wet-chemical cutting process.

German Patent Document DE-OS 42 14 737 deals with the breaking up of materials with a brittle composition behavior. In this case, the breaking up is achieved by pressing the article to be broken up.

These operational methods are extremely energy and time consuming.

SUMMARY OF THE INVENTION

It is an object of the invention to provide a time and cost effective method for separating materials in metallic casings from the metal casings and an arrangement for carrying out the method.

The above and other objects are accomplished according to the invention by the provision of a method for separating materials in metallic casings from the metal casings, comprising the steps of: arranging an electrode system in a liquid; generating a high-energy pulse and coupling the high-energy pulse to the electrode system and; transferring a pressure pulse resulting from the generating step via a sound-conducting, flexible membrane, to the metallic casing with the material so that the material breaks up and falls from openings provided in the metallic casing.

According to a further aspect of the invention there is provided an arrangement for separating material in a metallic casing from the metal casing, comprising: means defining a volume filled with liquid; a sound-conducting, flexible membrane having at least one side in contact with the liquid of the volume and defining on the one side an operational area with liquid and on the other side of the membrane an active space; an electrode system disposed in the operational area, the metallic casing with the material that is to be processed being located in the active space; and an energy source coupled to the electrode system for applying a high-energy pulse to the electrode system, a pressure pulse being generated in the liquid of the operational space in response to the high-energy pulse applied to the electrode system and conducted to the metallic casing through the membrane for breaking up the material in the metallic casing.

By coupling the high-energy pulse to the brittle material, many operational steps of the prior art methods for breaking up and separating the metallic casings from the material therein have been eliminated. This makes use of the fact that the brittle material, which is broken up by the high-energy pulse, falls to the outside through existing openings in the metallic casing. No interfering residual particles reach the active space because of the partition between the operational area and the active space formed by the sound-conducting membrane. This results in fewer energy losses in the work area during the conversion of high-energy pulses to pressure.

As a result of the invention, no drying of the broken up material is necessary.

The method and arrangement are of the invention are explained in more detail below with the aid of exemplary embodiments as illustrated in the accompanying drawings.

DETAILED DESCRIPTION OF THE INVENTION

Figure 1:
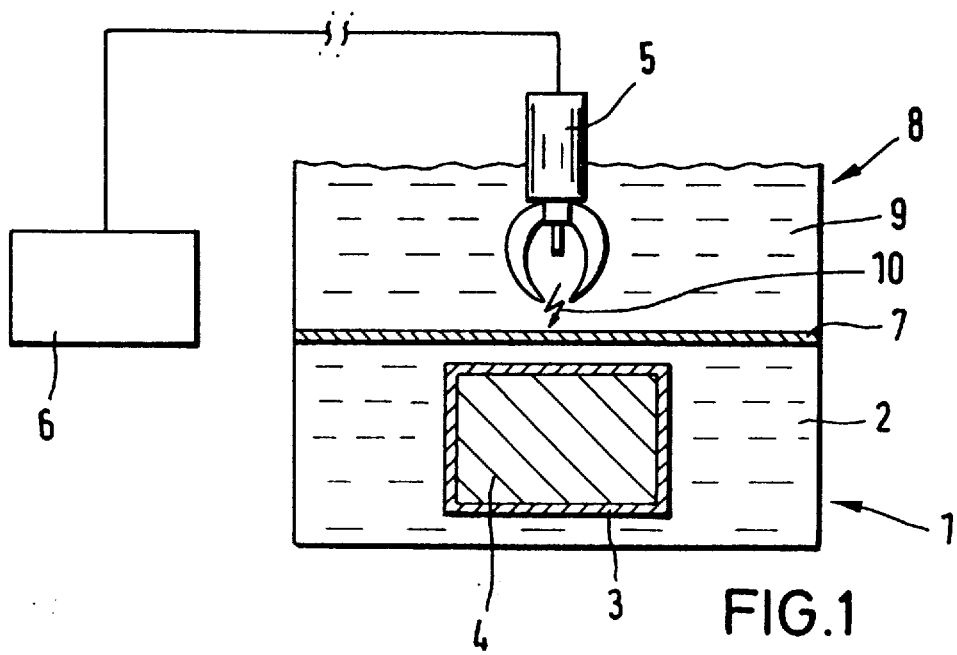
FIG. 1 is a schematic side view in partial section showing an arrangement of an electrode system relative to a material to be processed according to the principles of the invention.

Referring to FIG. 1, there is shown an active space 1, for example a vat with a liquid 2, for example water for industrial use. Inside vat 1 is a metallic casing 3, for example steel, brass, copper, with a material 4 to be processed that is preferably brittle, such as glass or ceramic. Active space 1 of the vat is separated from another active space which constitutes an operational area 8 by means of a sound-conducting, flexible membrane 7. Operational area 8 contains a liquid 9 and an electrode system 5, which is preferably positioned vertical to casing 3. Electrode system 5 is electrically connected to an energy source 6, which together generate a high-energy pulse 10.

Generation of the high-energy pulses takes place as follows. Inside energy source 6, a capacitor battery that is not shown in detail is charged in a traditional way via a direct current source, also not shown in detail, and is then discharged via a switching spark gap onto electrode system 5 that is positioned in liquid 9. As a result, a layer in liquid 9 becomes more dense, which generates a pressure pulse on sound-conducting membrane 7. The pressure pulse is transferred via liquid 2 in active space 1 or directly to metallic casing 3 with brittle material 4 that must be broken up. As a result of the strength of high-energy pulse 10 generated by electrode system 5 and the resulting pressure pulse, and the fact that the materials have places of discontinuity, a pressure and tension stress results at metallic casing 3 and brittle material 4 that must be broken up. Metallic casing 3 and material 4 have different material discontinuities, as is known, so that with the correct selection of high-energy pulse 10, the bonding forces of material 4, but not those of metallic casing 3 are nullified and only material 4 is broken up into small grain sizes. Preferably, high-energy pulse 10 has a voltage of 5 to 200 kV, a current of 10 to 100 kA and energy of 2 to 10 kJ/pulse. This produces a pressure pulse of 50 to 600 bar.

The high-energy pulse repetition rate is up to 1 Hz, meaning 1 pulse per second. The number of high-energy pulses 10 depends on the material. The harder material 4 is that is integrated in casing 3, the higher the number of high-energy pulses 10. Material 4 broken up in this way reaches liquid 2 in active space 1 through openings (not shown) in metallic casing 3 and is deposited there on the bottom. Following a complete break-up, the particles thus separated, metallic casing 3 and material 4 are removed from active space 1. A new casing 3 filled with material then can be placed into active space 1.

Figure 2:
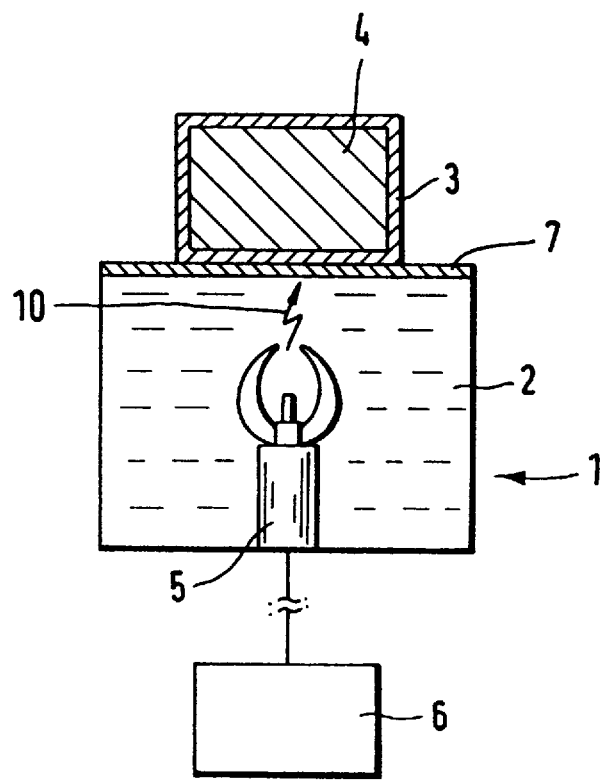
FIG. 2 is schematic side view in partial section showing another arrangement of the electrode system relative to the material to be processed according to another embodiment of the invention.

FIG. 2 shows another embodiment of the invention. Electrode system 5 is now in active space 1 with liquid 2, so that the active space becomes the operational area for high-energy pulse 10. The sequence for the process is as follows:

The generated pressure pulse is transferred via sound-conducting membrane 7 directly to metallic casing 3 with material 4 to be broken up. The broken up material 4 falls from the openings of metallic casing 3 and is then located directly on membrane 7, from which it can be removed.

Figure 3:
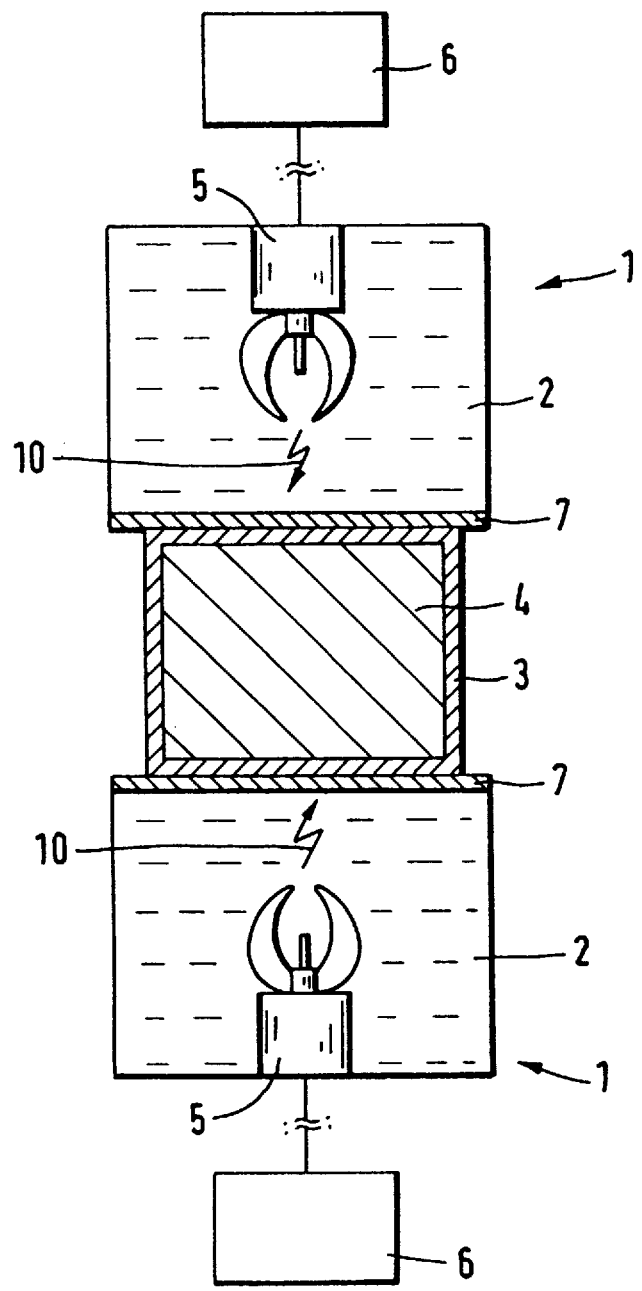
FIG. 3 is a schematic side view in partial section showing another arrangement of the material to be processed and a multiple arrangement of the electrode system according to yet another embodiment of the invention.

FIG. 3 shows a multi-electrode system 5 according to a further embodiment of the invention. In this case, metallic casing 3 with brittle material 4 is located between two active spaces 1, which are each encapsulated by a sound-conducting membrane 7. As described for FIG. 2, the generated pressure pulses are transferred via the respective sound-conducting membrane 7 directly to the metallic casing 3 with material 4.

By integrating two or more electrode systems 5, preferably arranged in encapsulated energy converters, which are aimed at materials 3 and 4 to be processed, the effectiveness of the energy conversion (energy yield) is increased by up to 80%. The time expenditure is also reduced.

It is understood that the invention is not limited to the exemplary embodiments shown, but permits changes within the scope of the invention as defined in the claims. Thus, the arrangement shown in FIG. 2 can be turned, so that material 4 to be broken up and casing 3 come to rest under electrode system 5, which is then preferably located in an encapsulated energy converter.

Also, electrode system 5, together with metallic casing 3 and material 4 that is to be broken up, can be placed directly into active space 1 with liquid 2. In that case, sound-conducting membrane 7 is not needed.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for separating a material disposed inside a metal casing from the metal casing, comprising the steps of:

providing a composite including the metal casing and the material disposed inside the metal casing;

arranging an electrode system distinct from the metal casing inside a liquid;

generating a high energy pulse on the electrode system through spark discharge in the liquid thereby generating a pressure pulse; and separating the material disposed in the metal casing from the metal casing by effecting an absorption of the pressure pulse by the composite thereby breaking up the material.

2. The method according to claim 1, wherein the material is a brittle material.

3. The method according to claim 1, wherein the step of generating includes the step of generating the high-energy pulse with an energy of 2 to 10 kJ per pulse.

4. The method according to claim 1, further comprising the step of providing a sound-conducting, flexible membrane for transferring the pressure pulse from the liquid to the composite.

5. The method according to claim 1, wherein the metal casing defines openings therein such that, when the material breaks up, it falls from the metal casing through the openings thereof.

6. An arrangement for separating a material disposed inside a metal casing from the metal casing, comprising:

a composite including the metal casing and the material disposed therein;

first means defining a first volume of liquid;

a first electrode system distinct from the metal casing arranged inside the first volume of liquid;

a first energy source coupled to the first electrode system for generating a first high energy pulse in the first volume of liquid thereby generating a first pressure pulse; and a first sound-conducting, flexible membrane having at least one side in contact with the first volume of liquid and defining, at the at least one side thereof, a first operational area, and another side thereof on which there is an active space;

a second means defining a second volume of liquid;

a second sound-conducting, flexible membrane having at least one side in contact with the second volume of liquid and defining, at the at least one side thereof, a second operational area, and another side thereof on which there is the active space, the active space thereby constituting a common active space between the first membrane and the second membrane;

a second electrode system distinct from the metal casing arranged inside the second volume of liquid; and a second energy source coupled to the second electrode system for generating a second high energy pulse in the second volume of liquid thereby generating a second pressure pulse;

wherein the composite is located in the common active space directly between the first membrane and the second membrane for receiving the first pressure pulse and the second pressure pulse through the first membrane and the second membrane, respectively, for separating the material disposed in the metal casing from the metal casing by breaking up the material.

7. An arrangement for separating a material disposed inside a metal casing from the metal casing, comprising:

a composite including the metal casing and the material disposed therein;

means defining a volume of liquid;

an electrode system distinct from the metal casing arranged inside the liquid;

an energy source coupled to the electrode system for generating a high energy pulse in the volume of liquid thereby generating a pressure pulse; and a sound-conducting membrane disposed in the volume of liquid and having one side on which there is defined an operational area in the liquid, and another side thereof on which there is defined an active space in the liquid, the electrode system being disposed in the liquid in the operational area and the composite being disposed in the liquid of the active space;

wherein the pressure pulse is received by the composite through the membrane for separating the material disposed in the metal casing from the metal casing by breaking up the material.

* * * * *